United States Patent
Sidorkin et al.

(10) Patent No.: US 11,379,738 B2
(45) Date of Patent: Jul. 5, 2022

(54) USING HIGHER ORDER ACTIONS TO ANNOTATE A SYNTAX TREE WITH REAL DATA FOR CONCEPTS USED TO GENERATE AN ANSWER TO A QUESTION

(71) Applicant: International Business Machines Corporation, Armonk, NY (US)

(72) Inventors: Oleg Sidorkin, Foster City, CA (US); Sergey Batin, Foster City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 508 days.

(21) Appl. No.: 16/575,341

(22) Filed: Sep. 18, 2019

(65) Prior Publication Data

US 2021/0081814 A1    Mar. 18, 2021

(51) Int. Cl.
*G06N 5/04* (2006.01)
*G06N 3/08* (2006.01)

(52) U.S. Cl.
CPC .............. *G06N 5/04* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 9,471,689 B2 | 10/2016 | Allen et al. | |
| 9,569,729 B1 | 2/2017 | Oehrle et al. | |
| 9,588,961 B2 | 3/2017 | Bruno et al. | |
| 2007/0124263 A1 | 5/2007 | Katariya et al. | |
| 2008/0235199 A1 | 9/2008 | Li et al. | |
| 2009/0089045 A1 | 4/2009 | Lenat et al. | |
| 2014/0310001 A1 | 10/2014 | Kalns et al. | |

FOREIGN PATENT DOCUMENTS

| | | |
|---|---|---|
| CN | 102521239 A | 6/2012 |
| CN | 108804521 A | 11/2018 |
| CN | 110188331 A | 8/2019 |

OTHER PUBLICATIONS

International Search Report and Written Opinion, dated Dec. 17, 2020, for International Patent Application PCT/182020/058338, filed Sep. 8, 2020, Total 10 pages.

(Continued)

*Primary Examiner* — Brian Whipple
(74) *Attorney, Agent, or Firm* — Konrad Raynes Davda & Victor LLP; David W. Victor

(57) ABSTRACT

Provided are a computer program product, system, and method for using higher order actions to annotate a syntax tree. An information space of the syntax tree is annotated with concepts corresponding to tokens in the syntax tree. A concept comprises an object in a domain of the question and relates to other concepts in an ontology of the domain. A higher order action specifies an input, action parameters, and an output. A determination is made of an element in the information space corresponding to the input of the higher order action. A determination is made of an action of in the domain of the question having parameters matching the action parameters. The determined element is input to the determined action to produce output. The information space of the syntax tree is annotated with the output from the higher order action to use to provide an answer to the question.

25 Claims, 9 Drawing Sheets

(56) References Cited

OTHER PUBLICATIONS

"A method to detect pattern in documents and add annotation to documents to implement intelligent question and answer system" dated May 26, 2014, An IP.com Prior Art Database Technical Disclosure, for IP.com No. IPCOM000236999D, Total 7 pages.

"Partial Matching for Natural Language Processing using TF/IDF, Token Matching, and Concept Matching" dated May 8, 2015, An IP.com Prior Art Database Technical Disclosure, for IP.com No. IPCOM000241540D, Total 5 pages.

"Context-Based Concept Resolution with Structured and Unstructured Sources" dated May 17, 2016, An IP.com Prior Art Database Technical Disclosure, for IP.com No. IPCOM000246223D, Total 7 pages.

D. Jurafsky et al., "Statistical Parsing" dated Sep. 23, 2018., Total 36 pages.

Léon Bottou, "From Machine Learning to Machine Reasoning" dated Feb. 8, 2011, Total 15 pages.

Daniel W. Otter et al., "A Survey of the Usages of Deep Learning in Natural Language Processing" dated 2018, Deep Learning in Natural Language Processing, Total 35 pages.

Omar Al-Harbi et al., "Lexical Disambiguation in Natural Language Questions (NLQs)" dated Jul. 2011, IJCSI International Journal of Computer Science Issues, vol. 8, Issue 4, Total 8 pages.

"IBM Embedded Business AI Framework" (online) retrieved from the Internet on Aug. 22, 2019 from URL>https://www.eba.ai/ . . . Total 70 pages.

UK Examination Report under Section18(3), dated Apr. 26, 2022 for GB Application No. 2204446.5, filed Sep. 8, 2020, Total 7 pages.

Action

High Order Action

```
show (1) VB VERB ROOT
 me (2) PRP PRON iobj
 list (5) NNS NOUN dobj
   all (3) DT DET det
   contact (4) NN NOUN nn
  in (6) IN ADP prep
    org (8) NN NOUN pobj
     my (7) PRP$ PRON poss
```

Output for Parsing Natural Language Text

FIG. 5

```
show (1) VB VERB ROOT [:ActionShow]
 me (2) PRP PRON iobj [:ActionShow]
 list (5) NNS NOUN dobj [:ContactLists] [:Lists]
  all (3) DT DET det
  contact (4) NN NOUN nn [:ContactLists]
  in (6) IN ADP prep [:Contains] [:Relation]
   org (8) NN NOUN pobj [:Organization]
    my (7) PRP$ PRON poss [:Own]
```

FIG. 6

USING HIGHER ORDER ACTIONS TO ANNOTATE A SYNTAX TREE WITH REAL DATA FOR CONCEPTS USED TO GENERATE AN ANSWER TO A QUESTION

BACKGROUND OF THE INVENTION

1. Field of the Invention

The present invention relates to a computer program product, system, and method for using higher order actions to annotate a syntax tree with real data for concepts used to generate an answer to a question.

2. Description of the Related Art

The Embedded Business Artificial Intelligence Framework from International Business Machines Corporation allows customers to create functions and an ontology of concepts and attributes for a domain specific natural language processing environment that are used to recognize and reason about natural language patterns to perform natural language understanding and linking language tokens to appropriate concepts. The customer may provide actions in the domain that process the nodes in a syntax tree formed from a sentence to understand to generate real data for the concepts. The annotated concepts are used to understand a sentence or provide an answer to a question being modeled in a syntax tree. In the process of reasoning about a question, the system considers all possible outcomes it can take given a set of actions and rules, ultimately selecting the best one or asking for user disambiguation in cases where the reasoning engine cannot find an answer.

There is a need in the art to provide improved techniques for adding real data to an information space of a sentence being processed to improve the natural language processing.

SUMMARY

Provided are a computer program product, system, and method for using higher order actions to annotate a syntax tree with real data for concepts used to generate an answer to a question. A syntax tree is generated from a question to process. An information space of the syntax tree is annotated with concepts corresponding to tokens in the syntax tree, wherein a concept comprises an object in a domain of the question and relates to other concepts in an ontology of the domain. A higher order action specifies an input, action parameters, and an output. A determination is made of an element in the information space of the syntax tree corresponding to the input of the higher order action. A determination is made of an action of a plurality of actions in the domain of the question having parameters matching the action parameters. The determined element is provided as input to the determined action to produce output of the determined action that is processed according to the output specified by the higher order action. The information space of the syntax tree is annotated with the output from the higher order action to use to provide an answer to the question.

Further provided are a computer program product and system comprising a syntax tree generated from a question to process comprising an information space annotated with concepts corresponding to tokens in the syntax tree. A concept comprises an object in a domain of the question and relates to other concepts in an ontology of the domain; a plurality of actions in the domain of the question having parameters. A higher order action specifies an input, action parameters, and an output. The higher order action is processed to determine an element in the information space of the syntax tree corresponding to the input of the higher order action and to determine an action of the plurality of actions having parameters matching the action parameters. The determined element is provided as input to the determined action to produce output of the determined action that is processed according to the output specified by the higher order action. The information space of the syntax tree is further annotated with the output from the higher order action to use to provide an answer to the question.

The above embodiments provide improvements to computer technology for annotating a syntax tree for natural language processing by providing higher order actions that take as a parameter action parameters to match with existing actions to invoke to process input that may. The higher order action is processed to determine all actions having parameters that match the action parameters specified for the higher order action. This allows the developer to define a higher order action specifying action parameters or a signature to use to determine other previously defined actions to produce output from current element s in the syntax tree to use to annotate the information space of the syntax tree.

The subject matter of the embodiments may optionally include an optional embodiment that each of the plurality of actions has parameters of a constraint, an input comprising an element in the information space of the syntax tree to which the constraint applies, and an output produced by the action in response to the input satisfying the constraints. The determination of the action matching the action parameters comprises determining an action having a constraint, an input, and an output that matches a constraint, an input and an output of the action parameters in the higher order action.

With the above embodiments, the constraint for the input allows the user to specify constraints or conditions for the input parameter to ensure that the higher order action applies to those inputs satisfying the condition of the constraint to provide more fine grained control over the applicability of the higher order action. In this way, actions are determined having a constraint, an input and an output parameters matching those of the higher order action.

The subject matter of the embodiments may optionally include an optional embodiment that the higher order action specifies a constraint for the input. Determining the element in the information space of the syntax tree corresponding to the input of the higher order action comprises determining whether the information space of the syntax tree includes a concept satisfying the constraint of the input of the higher order action. The determined action is applied to the concept satisfying the constraint of the input of the higher order action. The output from the higher order action provides real data for the concept corresponding to the input of the higher order action.

With the above embodiments, the higher order action is used to determine concepts satisfying the constraint of the input so that the determined action can be applied to the concept satisfying the constraint to provide output of data for that concept to annotate in the information space of the syntax tree. This allows a higher order action to trigger application of other qualifying actions to apply to the concepts in the information space to generate data for the concepts in the information space to improve the determination of answers to the question represented in the syntax tree.

The subject matter of the embodiments may optionally include an optional embodiment that the higher order actions and the actions receive as input concepts in the information space to produce output comprising data for the concepts. A determination is made of candidate answers from the data produced for the concepts from at least one higher order action and a sense metric for each candidate answer to the question. The sense metrics for the candidate answers are used to select a candidate answer as an answer to the question.

With the above embodiments, if there are multiple candidate answers resulting from processing the data produced for concepts from at least one higher order action, then sense metrics for the candidate answers are used to select a candidate answer having a best sense metric value to return a best answer to the question.

The subject matter of the embodiments may optionally include an optional embodiment that the determining the action comprises determining a plurality of actions having parameters matching the action parameters. For each of the determined plurality of actions, a determination is made of a matching strength indicating a strength of a match of the parameters of the determined action and the action parameters. A selection is made of an action having a highest matching strength to apply to the element in information space of the syntax tree corresponding to the input of the higher order action.

With the above embodiments, if there are multiple determined actions having parameters matching the action parameters of the higher order action, then a matching strength of the actions is determined to select an action to process the element in the information space having a highest matching strength. This allows for a determination of multiple different possible actions that match the higher order action parameters to expand the number of actions that are considered as matches to increase a likelihood of finding a best action satisfying the higher order action parameters.

BRIEF DESCRIPTION OF THE DRAWINGS

FIG. 5 illustrates an example of a syntax tree generated from the question terms.

FIG. 6 illustrates an example of the syntax tree further annotated with concepts for the question tokens in the syntax tree.

DETAILED DESCRIPTION

In current systems, a user may create actions in a domain that are used to generate real data into nodes of a syntax tree for concepts in the syntax tree. The actions are coded to perform specific data gathering operations based on the concepts and data already in an annotated syntax tree, such as determine a number of an item, a number or description of items that satisfy an attribute, and gather other information from a database or users. The data outputted by the actions may be added to the information space and used to answer questions modeled in the syntax tree in the information space.

Described embodiments provide improvements to computer technology for natural language processing of an information of a syntax tree by providing higher order actions that take as a parameter action parameters to match with existing actions to invoke to process input that may be defined as a collection of items or a concept. The higher order action is processed to determine all actions having parameters that match the action parameters specified for the higher order action. This allows the developer to define a higher order action specifying action parameters or a signature to use to determine other previously defined actions in the domain having parameters or a signature that match to some degree of confidence the action parameters specified in the higher order action. The determined previously defined actions in the domain matching the parameters of the higher order action may then be applied to concepts or data in the annotated syntax tree, including collections of items in the annotated syntax tree.

Figure 1:
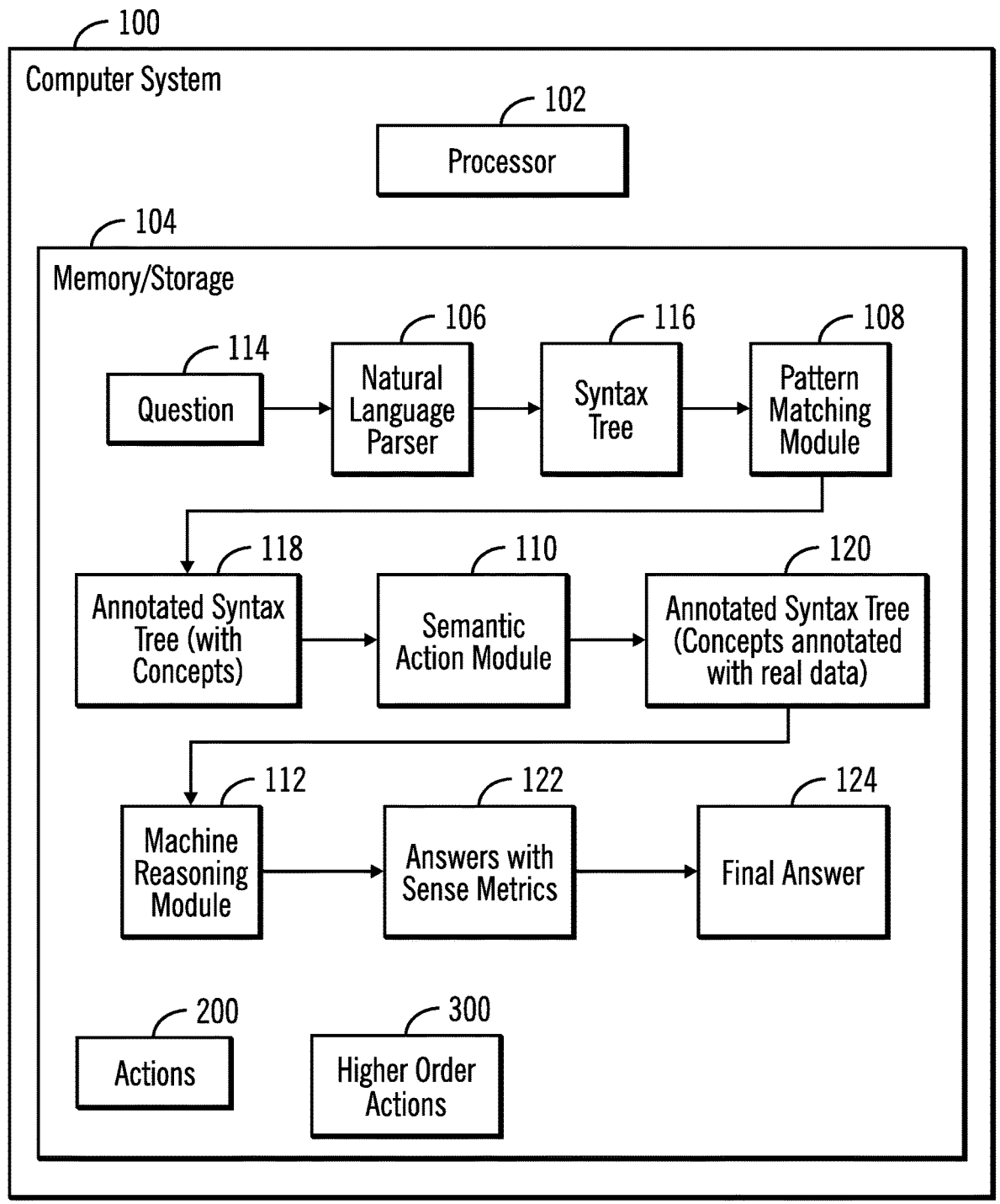
FIG. 1 illustrates an embodiment of a natural language computing system.

FIG. 1 illustrates an embodiment of a computer system having a processor 102 to execute program components stored in a memory/storage 104. The memory/storage 104 includes program components executed by the processor 102, including a natural language parser 106, a pattern matching module 108, a semantic action module 110, and a machine reasoning module 112. The natural language parser 106 parses a question 114 of words into a syntax tree 116, comprising an initial information space of the syntax tree 116, such as by performing part-of-speech tagging to mark words as corresponding to a particular part of speech based on its definition, context and lemmatization to determine the lemma of a word based on its meaning; a pattern matching module 108 to match natural language tokens in the syntax tree 118 from the question 114 to concepts in a domain in which the question is asked to produce an annotated syntax tree 118, or updated information space of the syntax tree 118, with the concepts providing attributes and information on the meaning of the tokens/language in the question 114.

The patterns captured by the pattern matching module 108 add syntactical context in which a token of the question 114 is used. For instance, the term "weather" signifies a noun subject in this case. However, the word "weather" can contain a very different semantic meaning in other sentences, e.g. "can we weather the storm?". Based on the natural language pattern above, the pattern matching module 112 understands that this usage of "weather" is different from the first usage and, subsequently, it will not introduce the concept ":Weather" into its reasoning pipeline when answering the second type of question. A colon before a term, e.g., ":Term", denotes "Term" is a defined concept in the ontology of the domain in which the question 114 is asked. A concept may comprise an attribute in the data model of the domain. The pattern matching module 108 enables mapping of natural language in the question 114 to concepts in the ontology of the domain. There may be a tree of concepts for a token in the question 114 comprising separately listed annotations forming an annotation tree of separate concepts providing a starting point for reasoning on the meaning of the terms in the question 114. The concepts that annotate a token in the syntax tree 116 allow the system to consider and recognize these concepts as part of the token of the question 114 when processing the question 114. For instance, if a question asks "show trending products", then the term "trending" may be annotated with the concept of ":Trending" providing information on what trending means in the specific domain in which questions on a product would be asked and the term "products" may be annotated with the concept of "Products" providing information on the meaning of a product in the domain, such as for a particular retailer. Each token in the syntax tree 116 may be annotated with concepts.

The semantic action module 110 processes the nodes in the annotated syntax tree 118, which comprise tokens from the question 114 as well as annotated concepts for the tokens, with declared actions 200 and higher order actions 300, comprising functions that output real data corresponding to the concepts in the annotated syntax tree 118. The output of the semantic action module 110 is a further annotated syntax tree 120, or further updated information space of the syntax tree 120, annotated with concepts and real data, where the real data may provide system information from a database related to the concept, such as a list of products satisfying the concept, a number of products, etc. The machine reasoning module 112 processes this annotated syntax tree 120 having real data for the concepts and produces candidate answers 122 to the question 114 with a sense metric indicating a value or strength with which the answer 122 responds to the question 114. In one embodiment, the sense metric may be based on a number of words used to generate the candidate answer, a number of concepts processed for the answer, and a similarity between the semantical and syntactical representations of the question 114 and answer 122. Each applied action 200$_i$ and higher order action 300$_i$ may incrementally update the information space of the syntax tree 120, so that subsequent actions 200$_i$ and higher order actions 300$_i$ may process as input output added to the information space of the syntax tree 120 from previously executed actions and higher order actions.

The memory/storage 104 may comprise a suitable volatile or non-volatile memory for storing programs to execute and information used by the program 110 to execute.

Generally, program modules, such as the program components 106 through 124 may comprise routines, programs, objects, components, logic, data structures, and so on that perform particular tasks or implement particular abstract data types. The program components and hardware devices of the computer system 100 of FIG. 1 may be implemented in one or more computer systems, where if they are implemented in multiple computer systems, then the computer systems may communicate over a network The programs 106, 108, 110, 112, 200, 300 may comprise program code loaded into memory and executed by a processor. Alternatively, some or all of the functions may be implemented in hardware devices, such as in Application Specific Integrated Circuits (ASICs) or executed by separate dedicated processors.

In one embodiment, the programs 106, 108, 110, 112 may implement a machine learning technique such as decision tree learning, association rule learning, neural network, inductive programming logic, support vector machines, Bayesian network, etc., to perform their specific tasks in the natural language processing pipeline. The programs 106, 108, 110, 112 may comprise artificial neural network programs. Each neural network may be trained using backward propagation to adjust weights and biases at nodes in a hidden layer to produce the computed output, such as a syntax tree 116, annotated syntax tree 118 with concepts, execute actions to further annotate the syntax tree 120 with real data, and generate and answer to the question. In backward propagation used to train a neural network machine learning module, biases at nodes in the hidden layer are adjusted accordingly to produce the desired outcome based on specified confidence levels. Backward propagation may comprise an algorithm for supervised learning of artificial neural networks using gradient descent. Given an artificial neural network and an error function, the method may calculate the gradient of the error function with respect to the neural network's weights and biases.

In FIG. 1, arrows are shown between components in the memory/storage 104. These arrows represent information flow to and from the program components 106, 108, 110, and 112 and do not represent data structures in the memory 104.

Figure 2:
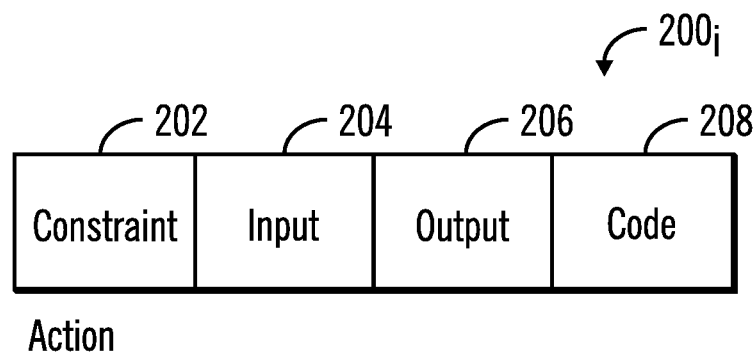
FIG. 2 illustrates an embodiment of an action used to annotate a syntax tree information space with real data.

FIG. 2 illustrates an embodiment of an instance of an action 200$_i$, as including parameters, also referred to as a signature, comprising a constraint 202, which is optional, an input 204, such as a concept or data, output 206 and code 208 for transforming the input 204 into the output 206. For an input 204, such as a concept or data node in the annotated syntax tree 118, satisfying the constraint 202, the code 208 generates output 206 from the input 204, such as a real data node for a concept, such as a number of instances of an item identified by the concept 204, and other information on the concept.

The constraint 202 may comprise a qualification for the concepts, and comprise a subject, (the input 204), a predicate, and an object, where the predicate constrains the subject to the object. For instance, "a subClassOf.list" constrains the symbol a to be any list, so that a concept node in the annotated syntax tree 118 must comprise a list in order to be subject to the action 200$_i$. The input 204 may comprise a tree of concepts that must be matched for the action to be selected for execution. The output 206 may comprise a flat list of concepts or real data comprising the concept. Concepts within a signature can further be qualified with additional specifications. The default parameter for the input may be a concept. However, the input may also comprise real data produced for a concept by another action, such as real product data, real invoice data, etc.

Examples of actions include:

:ActionShow—concept which represents a user's request to have data shown. It will produce :Showable data.

:ActionModify—concept which represents a user's request to have data updated. It will modify data and post a message to the user.

:ActionDelete—concept which represents a user's request to have data removed. It will remove data and produce a textual response to the user.

A further example of an action is GetTrendingProducts having a signature ":Products (:Trending)→data :products". This action specifies that for the input concept "Products" that are trending, which is the constraint, data on trending products will be the output, such as products that are recently popular, i.e., trending.

An example of an action that searches a database for a product by name (SearchProductByName) may have a signature of "Product (optional :WithName(data :UserString))→data :Product", such that for a concept in the tree being constrained as having the name ":UserString", the data :Product will be outputted, comprising the products having the product name.

Figure 3:
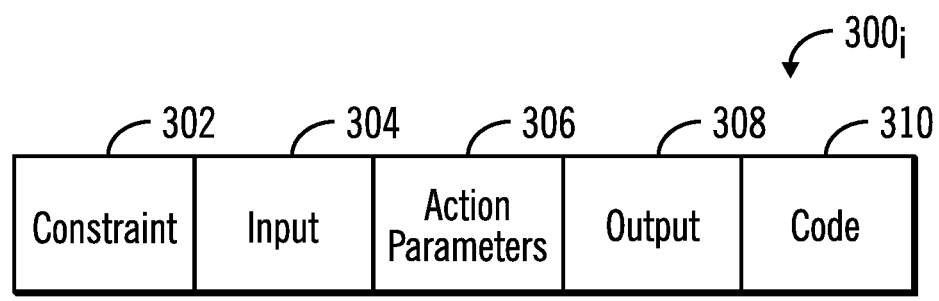
FIG. 3 illustrates an embodiment of a higher order action that takes as a parameter an action to further annotate a syntax tree information space with real data using already existing actions in the domain.

FIG. 3 illustrates an embodiment of an instance of a higher order action 300$_i$ including a constraint 302 for the input 304, comprising a node in the annotated syntax tree 118, action parameters 306, such as a signature, indicating parameters, such as a constraint, input, and output, to use to find one or more matching actions having parameters 202, 204, 206 matching those of the action signature 306, and an output 308 for the output 206 produced by the action $200_i$ matching the action parameters 306.

For the input 304, the tree nodes are scanned to determine a concept or data matching the input 304 and that satisfies any constraint 302 provided, the concept or data 304 satisfying the constraint 302 is then provided as input 204 to an action $200_i$ having parameters 202, 204, 206 matching the action parameters 306. The higher order action $300_i$ may further have code 310 for transforming the input 304 into the output 306.

With the higher order action $300_i$ the developer of the domain actions may specify the action parameters to 306 to use to find matching actions $200i$ to apply on a collection of the input 304, such as a collection of the constraint that modifies the input 304, such as to include or exclude the input 304.

For example, have a higher order action that excludes items, can be in the form of:

ExcludeItems: xs isListOf a⇒ActionExclude(data xs, action [data xs→data xs])→:Message, where the action name "ExcludeItems" has as input the concept xs that is constrained to be a list some item having attribute a. The ActionExclude specifies that action parameters 306 follow that takes a collection xs, comprising a list of a, and returns a collection, then outputs that collection in a message.

In this way, the higher order action $300_i$ takes another action as a parameter, and takes a collection of data as input, comprising a constraint 302 on an input 304 node, comprising a concept or data node, and then performs the action $200_i$ having parameters 202, 204 matching the action parameters 306 on the collection of data so as to include or exclude items, such as locate a subset of items from the collection of data formed from the input 304 based on an attribute, parameter or query defined by the matching action $200_j$. With the embodiment of FIG. 3, the developer or user does not have to determine the specific action in advance, but can locate actions having parameters, e.g., a signature, matching that of the action parameters 306 to use to exclude data from a collection based on the input 304 and constraint 302, and produce output data to include in the information space of the annotated syntax tree 120. If the higher order action $300_i$ specifies code 310, than that code 310 may further be executed if the input 304 satisfies the constraint 302.

Figure 4A:
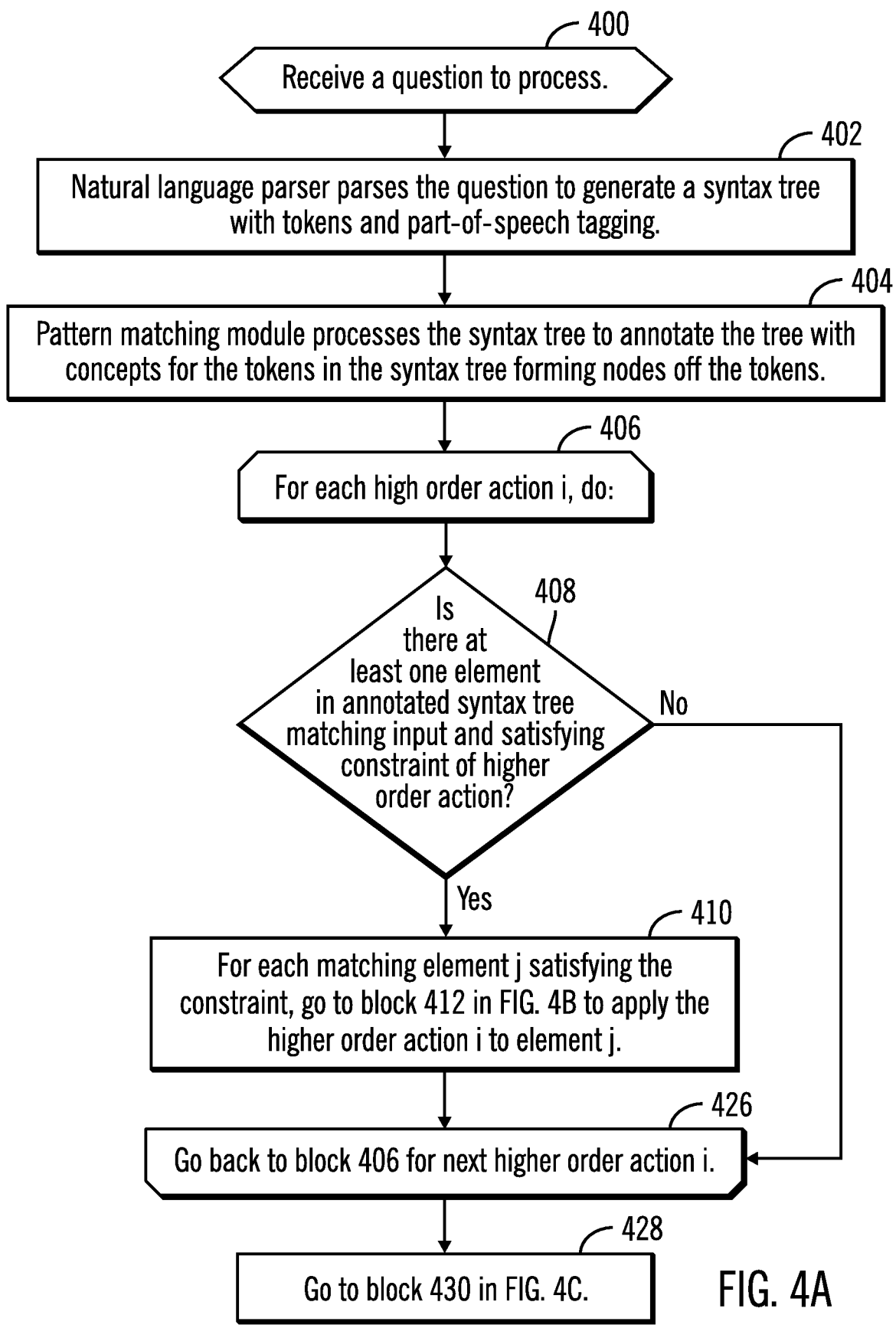
FIGS. 4*a*, 4*b*, and 4*c* illustrate an embodiment of operations to generate an information space for a question to use to generate an answer to the question.
Figure 4B:
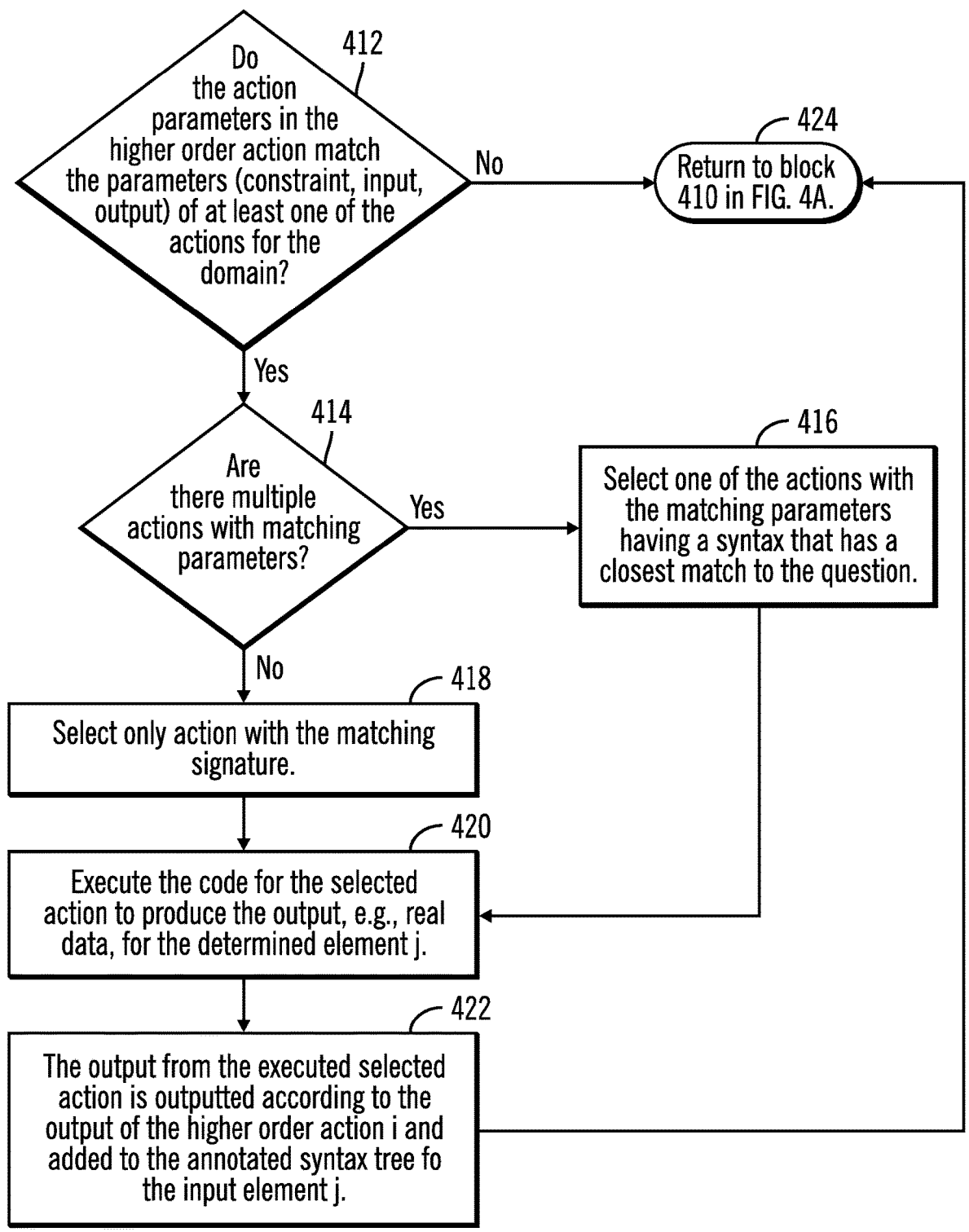
Figure 4C:
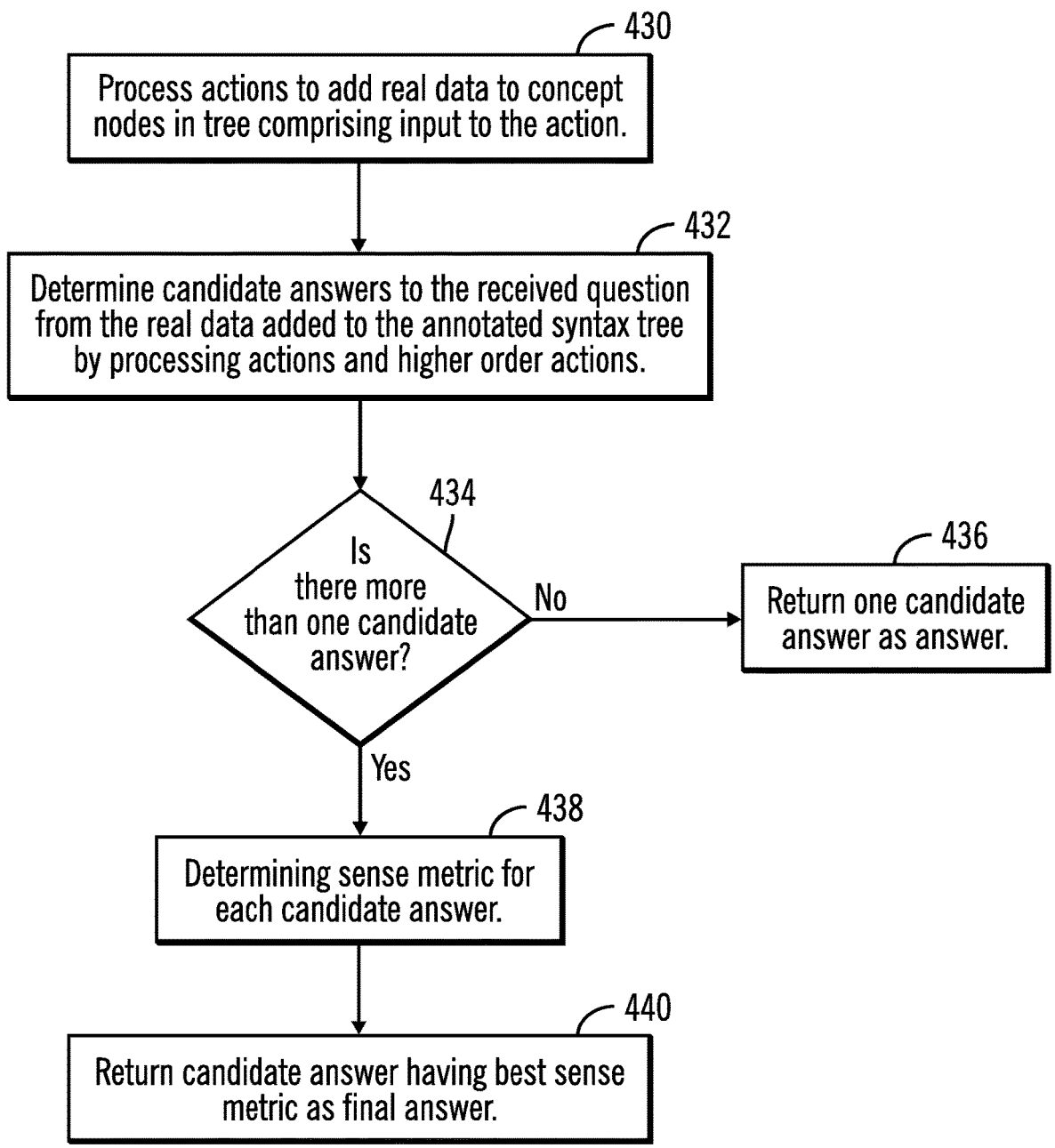

FIGS. 4a, 4b, and 4c provide an embodiment of operations performed by the natural language parser 106, pattern matching module 108, semantic action module 110, and machine reasoning module 112 to process an input question 114 to determine an answer 124 to provide for the question 114. Upon receiving (at block 400) a question 114 to process, the natural language parser 106 parses (at block 402) the question to generate a syntax tree 116 with tokens and part-of-speech tagging. The pattern matching module 108 processes the syntax tree 116 to annotate the tree 116 with concepts for the tokens in the syntax tree forming nodes off the tokens to produce an annotated syntax tree 118. The semantic action module 110 performs a loop of operations at blocks 406 through 426 for each higher order action $300_i$ in the domain of the question 114. If (at block 408) there is no matching element in the tree 118, then control proceeds to block 426 to process a next higher order action $300_i$ until all higher order actions 300 are processed. If (at block 408) there is at least one element, e.g., concept or data, in the annotated syntax tree 118 matching the input 304 of the higher order action $300_i$ and satisfying the constraint 302, then for each matching element j satisfying the constraint 302, control proceeds (at block 410) to perform blocks 412 through 426 in FIG. 4b to apply the higher order action i to element j.

If (at block 412) the action parameters 306 in the higher order action $300_i$ match the parameters (constraint 202, input 204, output 206) of at least one of the actions $200_k$ for the domain and if (at block 414) there are multiple actions $200_i$ with matching parameters, then the semantic action module 110 selects (at block 416) one of the actions with the matching parameters 202, 204, 26 having a syntax that has a closest match to the question 114. Otherwise, if (at block 414) there is only one matching action $200_k$, then that one matching action $200_k$ is selected (at block 418). From block 416 or 418, the code 208 for the selected action $200_k$ is executed (at block 420) to produce the output 206, e.g., real data, for the determined element j, such as a number of items or a number of items satisfying a criteria. The output 206 from the executed selected action $200_k$ is outputted (at block 422) according to the output 308 of the higher order action i and added as data or some other element to the annotated syntax tree 120. From the no branch of block 412 if there are no matching actions or after outputting the real data at block 422, control proceeds (at block 424) to return to block 410 in FIG. 4a. Further, the code 310 for the higher order action $300_i$ may also be executed if provided.

After processing all the higher order actions 300 to add real data to the annotated syntax tree 120, control proceeds (at block 428) to block 430 in FIG. 4c to continue processing the annotated syntax tree 120 to determine the final answer 124. At block 430 the semantic action module 110 may further process the actions 200 to output real data for input nodes 204 in the annotated syntax tree 120 to provide further real data for the information space to answer the question 114, such as providing information from a database or other specific information for concepts, e.g., a number of products, list of products satisfying a criteria, etc. The machine reasoning module 112 processes the annotated syntax tree 120 to determine (at block 432) candidate answers 122 to the received question from the real data added to the annotated syntax tree by processing actions 200 and higher order actions 300. If (at block 434) there is only one candidate answer 122, then that candidate answer 122 is returned (at block 436) as the final answer 124 to the question 114. If (at block 434) there are multiple candidate answers 122, then a sense metric is determined (at block 438) for each candidate answer 122 indicating a degree to which the candidate answer 122 is a response to the question 114. The candidate answer 122 having the best sense metric is returned (at block 440) as the final answer 124.

With the embodiment of FIGS. 4a, 4b, 4c, a higher order action may be used to exclude or modify items in a collection to which an action is applied by having the higher order action take as an input another action having a constraint, input, and output matching an action parameter specified for the higher order action to find all actions that can perform the operation specified by the action parameter in the higher order action $300_i$. Described embodiments allow the reuse of existing semantic actions in order to develop new functionality by specifying a collection or list of items for a concept and then specifying a signature or parameters of an action to find one or more actions to which to apply to the collection of items.

FIG. 5 illustrates an example of an initial information space of a syntax tree 500, such as syntax tree 116, produced from the natural language parser 106 for an example question "show me a list of all contacts in my organization" with the tokens and function of the token in the question.

FIG. 6 illustrates an example of an information space of an annotated syntax tree 600, such as annotated syntax tree 118, annotated with concepts, such as :ActionShow, :ContactLists, :Contains :Relation, :Organization, and :Own that provide concepts for the terms or tokens in the syntax tree 116.

Figure 7:
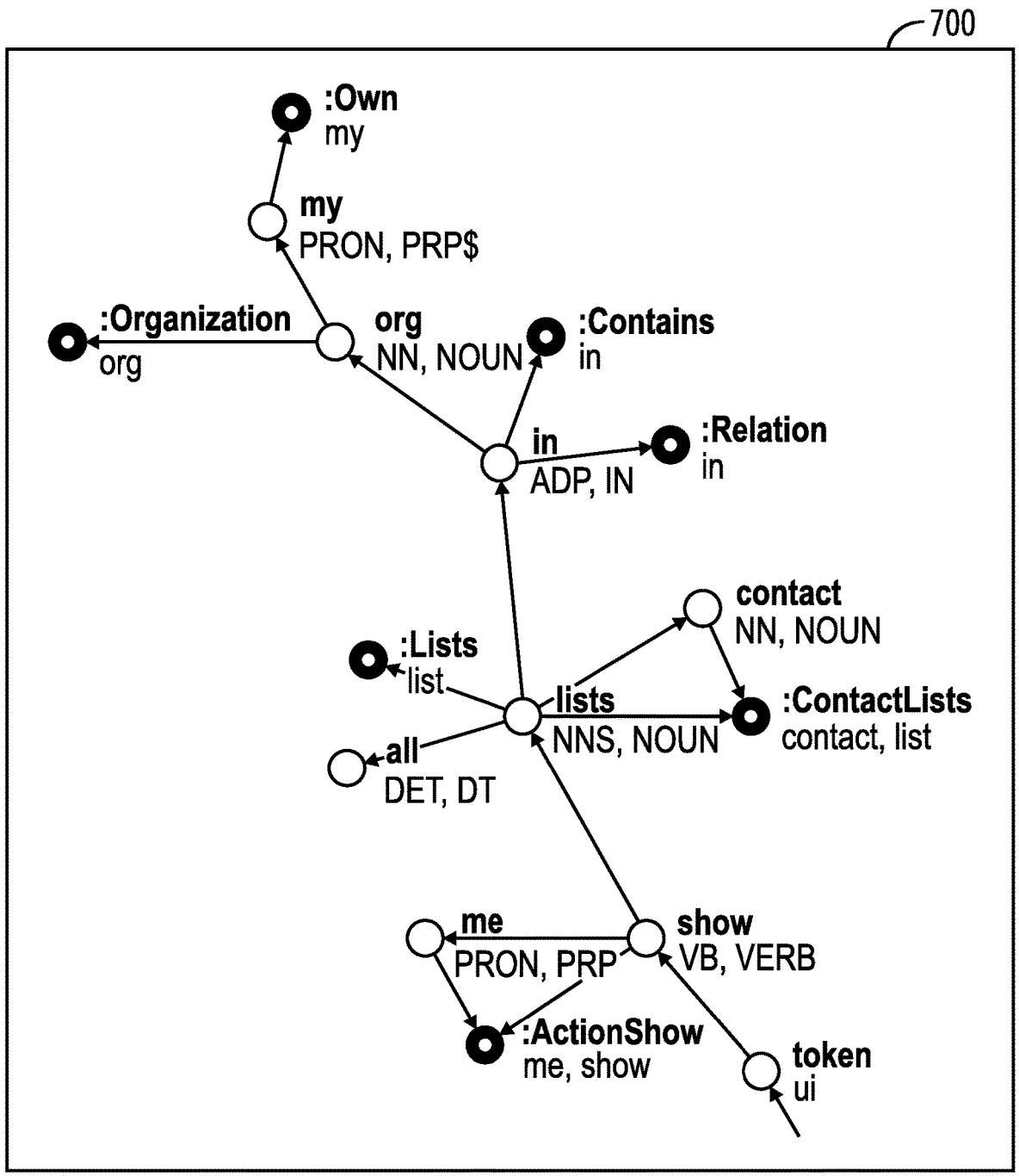
FIG. 7 shows the annotated syntax tree of FIG. 6 represented as nodes for the question tokens and the concepts linked to the question tokens.

FIG. 7 shows an information space of the syntax tree 700 representing the syntax tree 600 in node form, where the nodes having the terms in the question 114 are shown as solid filled, are linked to concept nodes shown with a white center.

Figure 8:
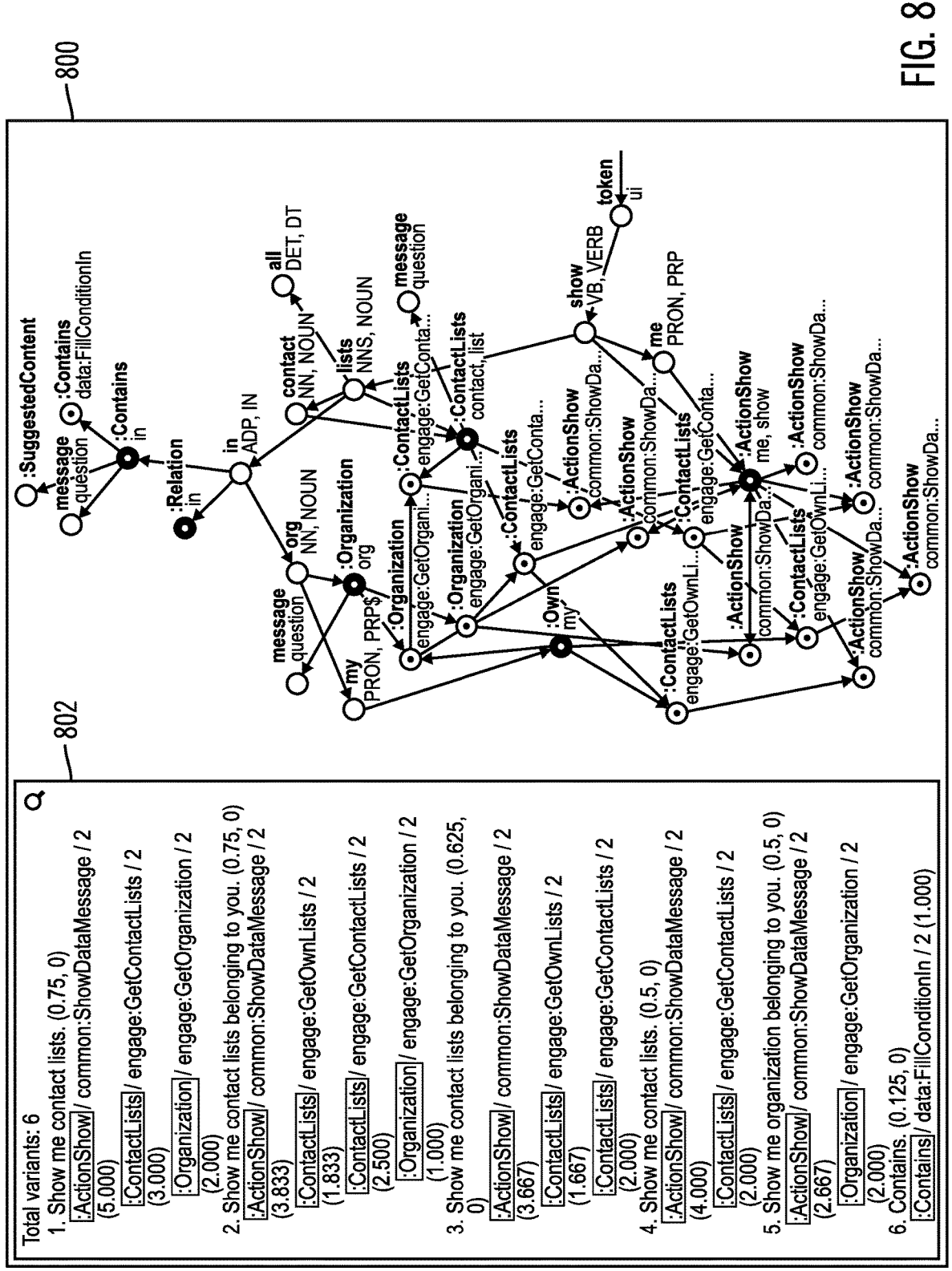
FIG. 8 illustrates an example of the syntax tree further annotated with real data linked to the concepts by processing actions and higher order actions that apply to concepts and data nodes in the annotated syntax tree.

FIG. 8 shows a further annotated information space of a syntax tree 800, such as annotated syntax tree 120, after actions 200 are applied to add real data nodes linked to the concept nodes, where the real data nodes generated by the actions are shown as white nodes with a color center. The variants panel 802 shows the actions used to generate the real data nodes, shown as white nodes with a solid center, for the concepts, shown as solid nodes with a white center. The annotated syntax tree 800 may be processed to generate the candidate answers to the questions by considering the real data generated for the concepts linked to the question tokens or terms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the computer system 100, may be implemented in one or more computer systems. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

Figure 9:
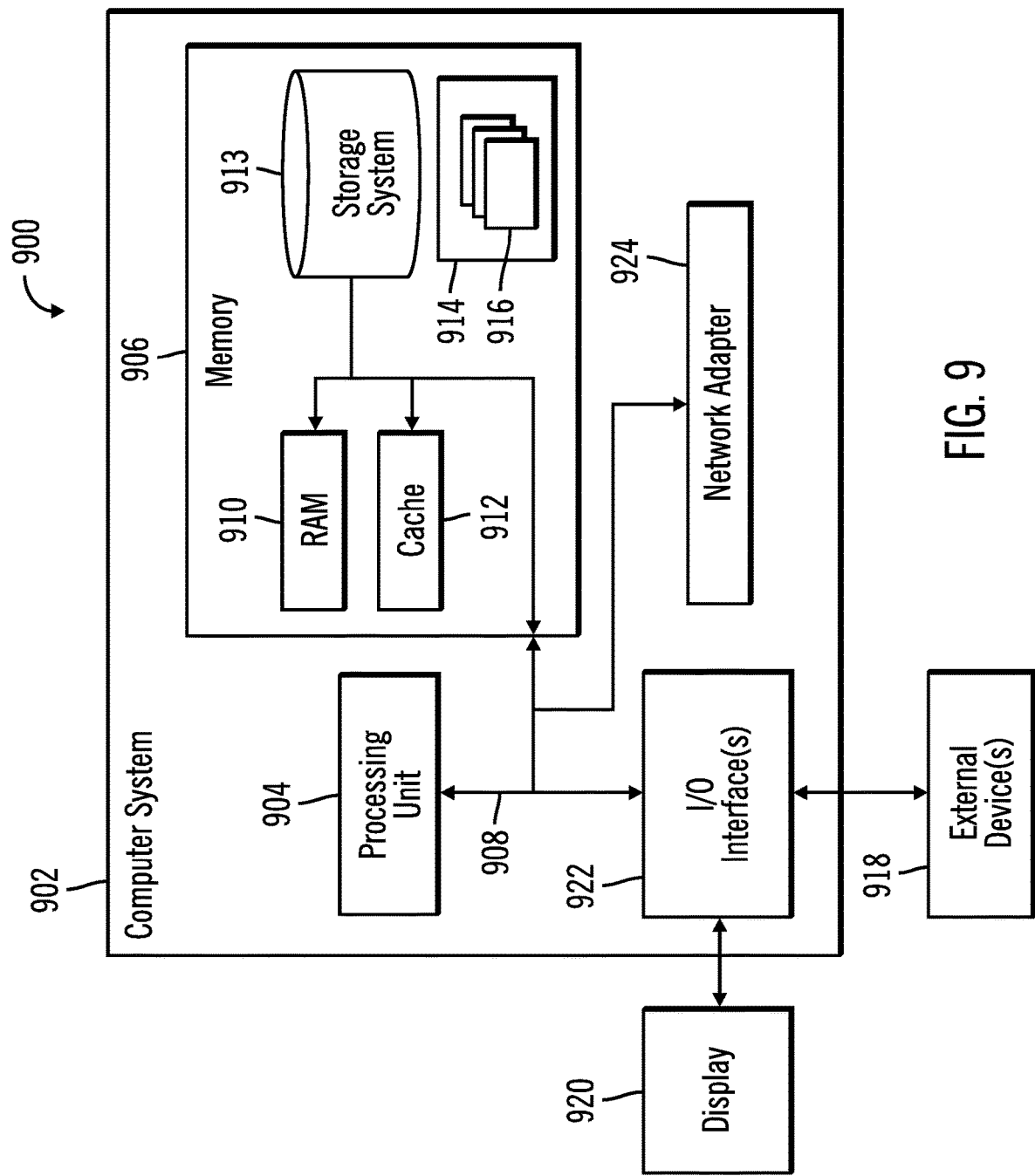
FIG. 9 depicts a computing environment in which the components of FIG. 1 may be implemented.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to, microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing language statements in a computing system, wherein the computer program product comprises a computer readable storage medium having computer readable program instructions executed by a processor to perform operations, the operations comprising:
    generating a syntax tree from a question to process;
    annotating an information space of the syntax tree with concepts corresponding to tokens in the syntax tree, wherein a concept comprises an object in a domain of the question and relates to other concepts in an ontology of the domain;
    providing a higher order action that specifies an input, action parameters, and an output;
    determining an element in the information space of the syntax tree corresponding to the input of the higher order action;
    determining an action of a plurality of actions in the domain of the question having parameters matching the action parameters;
    providing the determined element as input to the determined action to produce output of the determined action that is processed according to the output specified by the higher order action; and
    annotating the information space of the syntax tree with the output from the higher order action to use to provide an answer to the question.

2. The computer program product of claim 1, wherein each of the plurality of actions has parameters of a constraint, an input comprising an element in the information space of the syntax tree to which the constraint applies, and an output produced by the action in response to the input satisfying the constraints, wherein the determining the action matching the action parameters comprises determining an action having a constraint, an input, and an output that matches a constraint, an input and an output of the action parameters in the higher order action.

3. The computer program product of claim 1, wherein the higher order action specifies a constraint for the input, wherein the determining the element in the information space of the syntax tree corresponding to the input of the higher order action comprises:
    determining whether the information space of the syntax tree includes a concept satisfying the constraint of the input of the higher order action, wherein the determined action is applied to the concept satisfying the constraint of the input of the higher order action, and wherein the output from the higher order action provides real data for the concept corresponding to the input of the higher order action.

4. The computer program product of claim 1, wherein the determining the element in the information space of the syntax tree satisfying the input of the higher order action comprises determining multiple elements in the information space of the syntax tree, wherein the determined action is applied to each of the determined multiple elements to produce output of the higher order action to annotate each of the determined multiple elements of the information space of the syntax tree corresponding to the input of the higher order action.

5. The computer program product of claim 1, wherein the higher order action and the actions receive as input concepts in the information space to produce output comprising data for the concepts, and wherein the operations further comprise:
    determining candidate answers from the data produced for the concepts from at least one higher order action;
    determining a sense metric for each candidate answer to the question; and
    using the determined sense metric for the candidate answers to select a candidate answer as an answer to the question.

6. The computer program product of claim 1, wherein the input of the higher order action indicates a concept or data without specifying a constraint on the indicated concept or data, wherein the operations further comprise:
    determining whether the information space of the syntax tree includes an element comprising the concept or data indicated in the input of the higher order action, wherein the action having parameters matching the action parameters is processed to produce the output of the higher order action in response to an element in the information space of the syntax tree corresponding to the data or concept specified in the input.

7. The computer program product of claim 1, wherein the determining the action comprises determining a plurality of actions having parameters matching the action parameters, wherein the operations further comprise:
    for each of the determined plurality of actions, determining a matching strength indicating a strength of a match of the parameters of the determined action and the action parameters; and
    selecting an action having a highest matching strength to apply to the element in the information space of the syntax tree corresponding to the input of the higher order action.

8. The computer program product of claim 1, wherein the input for the higher order action specifies a concept and a constraint on the concept that forms a collection of concepts, wherein the determined action from the action parameters is applied to the collection of concepts.

9. A computer program product for processing language statements in a computing system, wherein the computer program product comprises a computer readable storage medium comprising:
- a syntax tree generated from a question to process comprising an information space annotated with concepts corresponding to tokens in the syntax tree, wherein a concept comprises an object in a domain of the question and relates to other concepts in an ontology of the domain;
- a plurality of actions in the domain of the question having parameters; and
- a higher order action that specifies an input, action parameters, and an output, wherein the higher order action is processed to determine an element in the information space of the syntax tree corresponding to the input of the higher order action and to determine an action of the plurality of actions having parameters matching the action parameters, wherein the determined element is provided as input to the determined action to produce output of the determined action that is processed according to the output specified by the higher order action, and wherein the information space of the syntax tree is further annotated with the output from the higher order action to use to provide an answer to the question.

10. The computer program product of claim 9, wherein each action of the plurality of actions has parameters of a constraint, an input comprising an element in the information space of the syntax tree to which the constraint applies, and an output produced by the action in response to the input satisfying the constraints, wherein the action having parameters matching the action parameters comprises an action having a constraint, an input, and an output that matches a constraint, an input and an output of the action parameters in the higher order action.

11. The computer program product of claim 9, wherein the higher order action specifies a constraint for the input, wherein the determined element in the information space of the syntax tree corresponding to the input of the higher order action comprises a concept satisfying the constraint of the input of the higher order action, wherein the determined action is applied to the concept satisfying the constraint of the input of the higher order action, and wherein the output from the higher order action provides real data for the concept corresponding to the input of the higher order action.

12. A system for processing language statements, comprising:
- a processor; and
- a computer readable storage medium having computer readable program instructions executed by the processor to perform operations, the operations comprising:
  - generating a syntax tree from a question to process;
  - annotating an information space of the syntax tree with concepts corresponding to tokens in the syntax tree, wherein a concept comprises an object in a domain of the question and relates to other concepts in an ontology of the domain;
  - providing a higher order action that specifies an input, action parameters, and an output;
  - determining an element in the information space of the syntax tree corresponding to the input of the higher order action;
  - determining an action of a plurality of actions in the domain of the question having parameters matching the action parameters;
  - providing the determined element as input to the determined action to produce output of the determined action that is processed according to the output specified by the higher order action; and
  - annotating the information space of the syntax tree with the output from the higher order action to use to provide an answer to the question.

13. The system of claim 12, wherein each of the plurality of actions has parameters of a constraint, an input comprising an element in the information space of the syntax tree to which the constraint applies, and an output produced by the action in response to the input satisfying the constraints, wherein the determining the action matching the action parameters comprises determining an action having a constraint, an input, and an output that matches a constraint, an input and an output of the action parameters in the higher order action.

14. The system of claim 12, wherein the higher order action specifies a constraint for the input, wherein the determining the element in the information space of the syntax tree corresponding to the input of the higher order action comprises:
- determining whether the information space of the syntax tree includes a concept satisfying the constraint of the input of the higher order action, wherein the determined action is applied to the concept satisfying the constraint of the input of the higher order action, and wherein the output from the higher order action provides real data for the concept corresponding to the input of the higher order action.

15. The system of claim 12, wherein the higher order action and the actions receive as input concepts in the information space to produce output comprising data for the concepts, and wherein the operations further comprise:
- determining candidate answers from the data produced for the concepts from at least one higher order action;
- determining a sense metric for each candidate answer to the question; and
- using the determined sense metric for the candidate answers to select a candidate answer as an answer to the question.

16. The system of claim 12, wherein the input of the higher order action indicates a concept or data without specifying a constraint on the indicated concept or data, wherein the operations further comprise:
- determining whether the information space of the syntax tree includes an element comprising the concept or data indicated in the input of the higher order action, wherein the action having parameters matching the action parameters is processed to produce the output of the higher order action in response to an element in the information space of the syntax tree corresponding to the data or concept specified in the input.

17. The system of claim 12, wherein the determining the action comprises determining a plurality of actions having parameters matching the action parameters, wherein the operations further comprise:
- for each of the determined plurality of actions, determining a matching strength indicating a strength of a match of the parameters of the determined action and the action parameters; and
- selecting an action having a highest matching strength to apply to the element in the information space of the syntax tree corresponding to the input of the higher order action.

18. A system for processing language statements, comprising:
- a processor; and
- a computer readable storage medium having computer readable program code executed by the processor comprising:
  - a syntax tree generated from a question to process comprising an information space annotated with concepts corresponding to tokens in the syntax tree, wherein a concept comprises an object in a domain of the question and relates to other concepts in an ontology of the domain;
  - a plurality of actions in the domain of the question having parameters; and
  - a higher order action that specifies an input, action parameters, and an output, wherein the higher order action is processed to determine an element in the information space of the syntax tree corresponding to the input of the higher order action and to determine an action of the plurality of actions having parameters matching the action parameters, wherein the determined element is provided as input to the determined action to produce output of the determined action that is processed according to the output specified by the higher order action, and wherein the information space of the syntax tree is further annotated with the output from the higher order action to use to provide an answer to the question.

19. The system of claim 18, wherein the higher order action specifies a constraint for the input, wherein the determined element in the information space of the syntax tree corresponding to the input of the higher order action comprises a concept satisfying the constraint of the input of the higher order action, wherein the determined action is applied to the concept satisfying the constraint of the input of the higher order action, and wherein the output from the higher order action provides real data for the concept corresponding to the input of the higher order action.

20. A method for processing language statements, comprising:
- generating a syntax tree from a question to process;
- annotating an information space of the syntax tree with concepts corresponding to tokens in the syntax tree, wherein a concept comprises an object in a domain of the question and relates to other concepts in an ontology of the domain;
- providing a higher order action that specifies an input, action parameters, and an output;
- determining an element in the information space of the syntax tree corresponding to the input of the higher order action;
- determining an action of a plurality of actions in the domain of the question having parameters matching the action parameters;
- providing the determined element as input to the determined action to produce output of the determined action that is processed according to the output specified by the higher order action; and
- annotating the information space of the syntax tree with the output from the higher order action to use to provide an answer to the question.

21. The method of claim 20, wherein each of the plurality of actions has parameters of a constraint, an input comprising an element in the information space of the syntax tree to which the constraint applies, and an output produced by the action in response to the input satisfying the constraints, wherein the determining the action matching the action parameters comprises determining an action having a constraint, an input, and an output that matches a constraint, an input and an output of the action parameters in the higher order action.

22. The method of claim 20, wherein the higher order action specifies a constraint for the input, wherein the determining the element in the information space of the syntax tree corresponding to the input of the higher order action comprises:
- determining whether the information space of the syntax tree includes a concept satisfying the constraint of the input of the higher order action, wherein the determined action is applied to the concept satisfying the constraint of the input of the higher order action, and wherein the output from the higher order action provides real data for the concept corresponding to the input of the higher order action.

23. The method of claim 20, wherein the higher order action and the actions receive as input concepts in the information space to produce output comprising data for the concepts further comprising:
- determining candidate answers from the data produced for the concepts from at least one higher order action;
- determining a sense metric for each candidate answer to the question; and
- using the determined sense metric for the candidate answers to select a candidate answer as an answer to the question.

24. The method of claim 20, wherein the input of the higher order action indicates a concept or data without specifying a constraint on the indicated concept or data, further comprising:
- determining whether the information space of the syntax tree includes an element comprising the concept or data indicated in the input of the higher order action, wherein the action having parameters matching the action parameters is processed to produce the output of the higher order action in response to an element in the information space of the syntax tree corresponding to the data or concept specified in the input.

25. The method of claim 20, wherein the determining the action comprises determining a plurality of actions having parameters matching the action parameters, further comprising:
- for each of the determined plurality of actions, determining a matching strength indicating a strength of a match of the parameters of the determined action and the action parameters; and
- selecting an action having a highest matching strength to apply to the element in the information space of the syntax tree corresponding to the input of the higher order action.

* * * * *